Mar. 3, 1925.

E. E. GREVE

OUTBOARD BEARING FOR STEAM ENGINES

Filed April 30, 1924

1,528,417

INVENTOR
Edgar E. Greve
by W. G. Doolittle
his attorney.

Patented Mar. 3, 1925.

1,528,417

UNITED STATES PATENT OFFICE.

EDGAR E. GREVE, OF BELLEVUE, PENNSYLVANIA.

OUTBOARD BEARING FOR STEAM ENGINES.

Application filed April 30, 1924. Serial No. 710,023.

*To all whom it may concern:*

Be it known that I, EDGAR E. GREVE, a citizen of the United States, residing at Bellevue, in the county of Allegheny and State of Pennsylvania, have invented certain new and useful Improvements in an Outboard Bearing for Steam Engines, of which the following is a specification.

This invention is for a bearing for steam engines, and is what I term an "outboard" bearing.

The invention is particularly adapted to engines, especially steam engines, used in oil and gas drilling. In engines employed in this work, considerable trouble is experienced due to the short life of the crank shaft bearings and the breakage of the crank shafts. These troubles are the result of the belts being tightened to such an extent that the crank shaft is pulled out of line.

As heretofore constructed, drilling engines have two bearings for the crank shaft, one being at each side of the crank. The flywheel overhangs one bearing and the pulley overhangs the other.

In order to avoid this breakage and trouble, I have devised a third bearing for the crank shaft which keeps the shaft from being pulled out of line, and thereby effects a great improvement in the engine.

The invention may be readily understood by reference to the accompanying drawing, in which.

Figure 1:
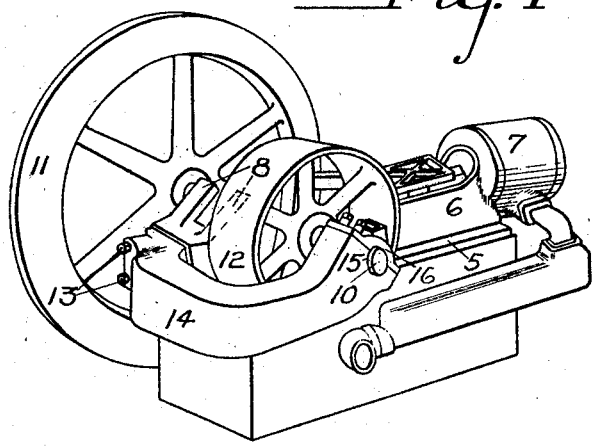
Fig. 1 is a perspective view of an engine equipped with my invention.
Figure 3:
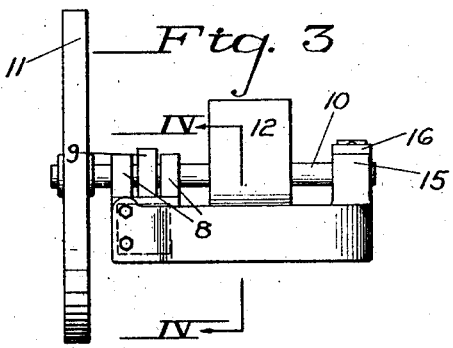
Fig. 3 is an end view thereof.
Figure 2:
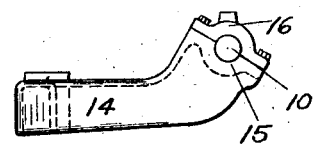
Fig. 2 is a side view thereof.
Figure 4:
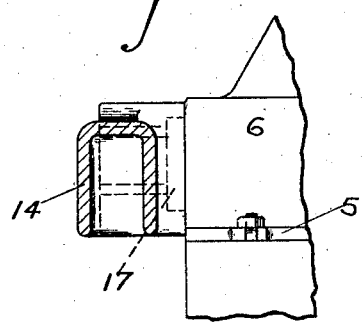
Fig. 4 is a section on line IV—IV of Fig. 3.

In the drawings, 5 designates the engine base, 6 is the bed of the engine, 7 designates the cylinder, and 8 designates each of the two bearings on the bed, one of these being at each side of the crank 9 in the crank shaft 10. The crank shaft carries the flywheel 11 on one end, in the usual manner, but the other end which carries the pulley 12, extends considerably further beyond the pulley than has heretofore been the practice.

Secured to one end of the engine bed, by suitable fastening means, such as bolts 13, is a curved rigid arm 14 whose free end terminates in proximity to the projecting end of the crank shaft. On this free end of the arm is a bearing 15 and a bearing cap 16. In order to more firmly hold the arm in proper alinement, an integral machined lug 17 projects from the end of the bed plate into a machined recess in the base of the arm, and it is through this lug that the bolts 13 pass.

It has been determined, from a large number of drilling engines now in use embodying the said invention, that a vast improvement is effected and the excessive wear of the bearings and breakage of parts eliminated.

I claim as my invention:

1. The combination with an engine having a bed plate, a crank shaft with a crank thereon, a bearing on the bed plate at each side of the crank and a pulley on one of the projecting ends of the crank shaft, of an arm secured to the base and curved around the pulley, and means on the curved arm engaging the shaft for supporting the same.

2. The combination with an engine having a bed plate, a crank shaft with a crank therein supported in spaced apart bearings on the bed plate, one bearing at each side of the crank, said crank shaft projecting laterally beyond the bed of the engine, a pulley on one of the projecting ends of the shaft, of an arm secured to the bed plate and extending beyond the pulley, and a bearing in the outer end of said arm in which the pulley carrying end of the crank shaft is received.

3. The combination with an engine including a bed and a crank shaft rotatably supported thereon, one end of the crank shaft projecting laterally beyond the bed, of an arm secured to the bed plate having a bearing in its outer end rotatably receiving the projecting end of the shaft.

4. The combination with an engine including a bed and a crank shaft rotatably supported thereon, one end of the crank shaft projecting laterally beyond the bed of the engine and having a pulley thereon, of a rigid arm secured to the end of the bed plate and curved outwardly around the pulley, and a bearing in the arm in which the projecting end of the crank shaft is supported.

5. The combination with an engine including a bed and a transverse crank shaft rotatably supported in bearings in the bed, one end of the crank shaft projecting laterally beyond the bed and having a pulley thereon, a lug on one end of the bed, of an arm having a recess in one end thereof into which said lug extends, means for securing the arm in place, said arm being curved and having its outer end terminating in proximity to the projecting end of the shaft, and a bearing on the outer end of the arm in which the projecting end of the shaft is rotatably supported in line with the bearings on the bed.

In testimony whereof I affix my signature.

EDGAR E. GREVE.